Sept. 14, 1965 W. ST. JOHN WHITE 3,206,752

RADIO NAVIGATIONAL SYSTEMS

Filed June 18, 1962 3 Sheets-Sheet 1

Sept. 14, 1965 W. ST. JOHN WHITE 3,206,752

RADIO NAVIGATIONAL SYSTEMS

Filed June 18, 1962 3 Sheets-Sheet 3

United States Patent Office 3,206,752

Patented Sept. 14, 1965

3,206,752

RADIO NAVIGATIONAL SYSTEMS

Wilfred St. John White, London, England, assignor to Decca Limited, London, England, a British company Filed June 18, 1962, Ser. No. 203,277

Claims priority, application Great Britain, June 19, 1961, 22,090/61

4 Claims. (Cl. 343—105)

This invention relates to radio navigation systems of the kind having a master station radiating signals of a given frequency and at least two slave stations radiating signals of the same frequency in fixed phase relationship with the master signals, one station radiating at a time with the various stations in a cyclic sequence, whereby at a mobile receiver, the phase of the signals received in succession from the master station and slave stations may be compared to determine the location of the receiver with respect to a pattern of equiphase lines. The transmitting stations may all be in fixed locations in which case the pattern of equiphase lines comprises sets of hyperbolae. Alternatively the slave stations may be fixed and the master station may be on a mobile craft with the receiver, in which case the determinations at the receiver of the phase relationship between the master signals and each slave signal are representative of the ranges from the various slave stations. In this latter arrangement commonly two slave stations are employed with one master and such systems are therefore known as two-range systems. The two-range system gives the maximum accuracy with the minimum number of fixed stations and does not require any lattice charts but, unlike the hyperbolic system, a two-range system with one master and two slaves can only be used with one vessel at a time.

According to this invention, in a phase comparison radio navigation system having a master station radiating signals of a given frequency and two or more slave stations radiating signals of the same frequency in fixed phase relationship with the master signals in a cyclic time sharing sequence, there is provided at least one further station radiating a signal of approximately the same frequency as the master station signals and the slave stations are also arranged to radiate signals locked in phase to the transmissions from said further station or stations, all the transmissions taking place one at a time in a cyclic time-sharing sequence controlled by synchronizing signals from the master station. With this arrangement each of the slave stations co-operates in turn with the master station and with the further station or with each further station if there is more than one. Such a further station will, for convenience, be referred to hereinafter as a mistress station. There is no requirement for any phase lock between the master and mistress transmissions which may be on unrelated frequencies. The frequencies however are made approximately equal (for example by being crystal controlled to the same nominal frequency) to enable, at each slave station and at each mobile receiver, the master and mistress signals to be received on the same receiving channel. The slave stations may have a common output stage and antenna system for radiating the sequential transmissions locked to the master and mistress signals.

It will be seen that, for use as a two-range system, the master and the mistress station may be arranged on separate craft and thus, using only two slave stations, it is possible for two or more craft to obtain two-range fixing. If desired, however, the master station and/or the mistress station may be arranged in fixed locations. It may be convenient, for example, in some cases, to have a master and two slave stations at fixed points and to have one or more mistress stations on separate mobile craft. The mobile craft with the mistress stations thus can obtain the maximum accuracy of position determination using a two-range system while hyperbolic fixing is available to an unlimited number of craft employing separate receivers utilizing the fixed master and slave stations.

The master station may be arranged to radiate control signals to effect synchronization of the transmissions from the mistress and slave stations and of the various receivers, for example by transmitting for a short period in each cycle of transmissions a signal of a frequency slightly different from the normal transmissions. This signal is thus identifiable by the different frequency and may be used to control timing circuits at the mistress and slave transmitters and at the receivers for cyclic switching of the various circuits. The mistress transmissions may be quite independent of the master transmissions apart from the control of the timing. Since the master station may move out of the range at which the control signals are effective, preferably provision is made for alternatively radiating the control signals from the mistress and/or one or other of the slave stations.

As an example of a cyclic sequence of signals, the master station may be arranged to transmit firstly a short duration synchronizing signal and then to radiate a longer duration signal for phase comparison purposes. After the master transmissions, the two slave stations would transmit in sequence signals of the master station frequency, the mistress station would transmit a signal of approximately the same frequency and the two slave stations would then transmit signals of the mistress frequency. If there is only a single mistress station the cycle would then recommence but if there is a further mistress station, it would then transmit in sequence followed by the appropriate slave transmissions.

At each slave station there may be first and second oscillators, associated respectively with the master and a first mistress station, which oscillators, during the appropriate master and mistress transmissions, are locked in phase each to the appropriate one of those transmissions and which serve to preserve the phase of these transmissions for controlling the phase of the slave transmissions during the appropriate periods in each cycle when the slave station transmits. If there is a second mistress station, a further oscillator would be provided at each slave station. Similarly at a mobile receiver there may be provided an oscillator which is locked to the phase of the master or mistress transmission, as required, and which provides a comparison signal for comparing with the appropriate signals radiated from the slave stations during the time periods in each cycle when the corresponding slave transmissions occur. A suitable construction of receiver having such a locked oscillator for comparing signals of the same frequency radiated in a cyclic time sequence is described in the specification of United States application No. 111,393 filed May 19, 1961.

Preferably the equipment is arranged so that a master station can operate as a mistress station or vice versa. In a two-range system using one master station and one mistress station, if the craft carrying the master station should for any reason leave the operational area or cease to transmit, the other craft can then change over from being a mistress station to being a master station.

In the following description reference will be made to the accompanying drawings in which.

Figure 1:
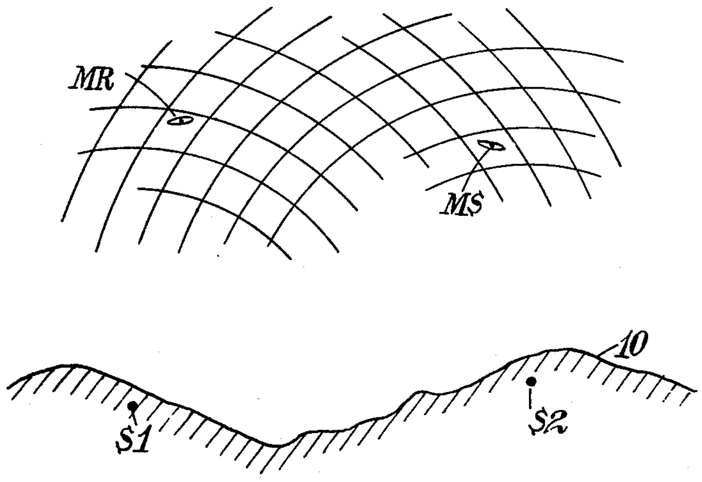
FIGURE 1 is a diagram illustrating a pattern of equiphase lines in one arrangement of a phase comparison radio navigation system.

FIGURE 1 is a diagram illustrating a pattern of equiphase lines obtained in a two-range radio frequency phase comparison navigation system. Referring to the figure there is shown a master station MR on a mobile craft, typically a ship, which master station co-operates with two slave stations S1 and S2 at fixed locations on land adjacent a coast line 10. A receiver is also carried on the same mobile craft as the master station MR. The various stations radiate radio frequency signals, all on the same frequency, in a time-sharing sequence, only one station transmitting at a time. The master station radiates radio frequency signals of a predetermined frequency which are picked up by the two slave stations S1 and S2. These slave stations, as will be described later, have oscillators which are locked in phase to the received master signals and provide sources of signals locked in phase to the master transmissions, for radiation by the slave stations. At the same mobile craft the phase relationship is measured between the signals received from the master station and the signals received from each of the two slave stations. These two phase determinations are each representative of a particular equiphase position line which passes through the position of the mobile craft. The intersection of these two lines thus gives a position fix. In a two-range system such as is shown in FIGURE 1 where the master station is on the mobile craft with the receiver, the equiphase position lines consist of one set of concentric circles 11 about the position of the slave S1 and a second set of concentric circles 12 about the position of the slave S2. A two-range system in its simplest form can only be used by one craft at a time but it has the advantage that the maximum accuracy is obtainable with only two fixed stations and, more particularly, there is no requirement for a chart with a hyperbolic lattice. Such a system is therefore particularly useful for survey work. The present invention enables a two-range system to be used by two craft co-operating with a single pair of slave stations. As previously explained this system makes use of what is known as a mistress station which is shown at MS in FIGURE 1 and which co-operates with the two slave stations S1 and S2, the transmissions from all these stations being on a time-sharing basis as will be more fully described later. The master station and slave stations provide transmissions during certain time periods for determining the position of the craft carrying the master station while the mistress station and slave stations radiate signals during different time periods with the slave transmissions locked to the previous mistress transmision to determine the position of the craft carrying the mistress station.

Although the arrangement of the present invention will be more particularly described with a system using only two slave transmitters, it will be obvious that more than two slave transmitters could be employed if so desired, the necessary transmissions taking place sequentially on an appropriate time sharing sequence. In practice however, two-range systems, as their name implies, are normally operated only with two slave stations.

Figure 2:
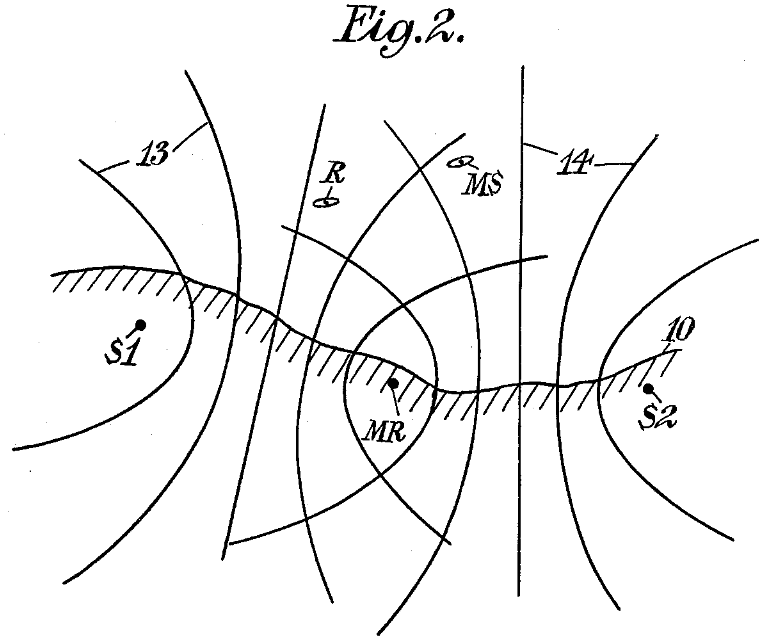
FIGURE 2 is a diagram illustrating another pattern of equiphase lines in a phase comparison radio navigation system.

In some cases it may be convenient to put the master station at a fixed location so that it can co-operate with the slave stations to provide a hyperbolic phase comparison position-fixing system as shown in FIGURE 2 where the master station MR, now at a fixed point, co-operates with the slave stations S1 and S2 respectively to provide two sets of intersecting equiphase lines 13, 14 respectively in the form of two hyperbolic lattices. In such an arrangement a craft, such as that indicated at R, is fitted with a receiver for receiving the transmissions from the master and two slave stations. By making a phase comparison of the received master and slave signals, the position of the craft can be determined with respect to the two sets of equiphase lines. The arrangement of the present invention however enables the slave stations of such a system to be used also with a mistess station MS which can co-operate with the two slave stations S1 and S2 so that the position of the mistress station can be determined as in a two-range system. The arrangement of FIGURE 2 thus permits of the full accuracy of a two-range system for survey work to be obtained yet enables the slave stations to be employed also as part of a hyperbolic navigation system to provide a general navigation area coverage system for any craft in the area equipped with receivers. It will be appreciated that any number of craft equipped with receivers can make use of the hyperbolic fixing system simultaneously.

The transmitting stations and receivers for both the systems such as has been described with reference to FIGURES 1 and 2 may be identical; the only difference between these systems is that for the system of FIGURE 2 the master station is at a fixed location and further craft may carry receivers whilst in the arrangement of FIGURE 1 the master station is on a mobile craft.

In the arrangement of the present invention the stations all radiate on the same frequency, the stations operating on a time-sharing basis. The master and mistress stations however are not locked in frequency although, as will be explained later, their frequencies are kept as close as is convenient and they would preferably be crystal-controlled so that they operate, within the limits of crystal stability, on the same frequency.

Figures 3, 4:
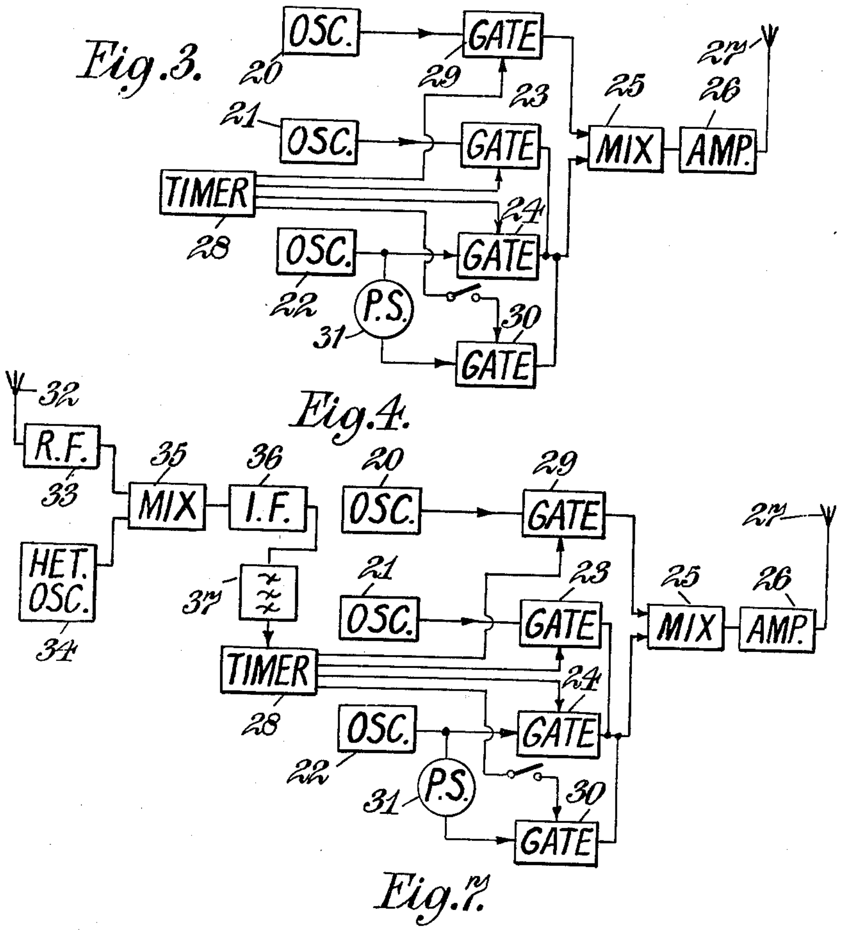
FIGURE 3 is a block diagram illustrating a master station for use in the navigation system of either FIGURE 1 or FIGURE 2.
FIGURE 4 is a block diagram illustrating a mistress station for use in the navigation system of either FIGURE 1 or FIGURE 2.

The master station is illustrated in FIGURE 3. This station is arranged to radiate a short duration continuous wave trigger signal for synchronizing purposes for a period typically of 0.1 of a second and then immediately after that to radiate a continuous wave signal of a very slightly different frequency for a period of 0.3 second. There is then an interval before the cycle recommences with the next trigger signal. During this interval there are transmissions from the two slave stations in sequence and then from the mistress station and again from the slave stations as will be described later. The frequency difference between the trigger signal and the normal radiation for phase comparison purposes may be quite small and typically a frequency difference of 60 cycles per second is used with a radiated frequency of the order of 2000 kc./s. The required frequencies for these radiated signals are produced in the arrangement illustrated in FIGURE 3 by means of three oscillators 20, 21 and 22. Oscillators 21 and 22 are relatively low frequency oscillators, for example, of the order of 132 kc./s. and these two oscillators have a frequency difference of the required difference between the trigger signal and phase comparison signal frequencies, that is to say the aforementioned 60 cycles per second. The outputs of the oscillators 21 and 22 are fed through gates 23, 24 respectively to a mixer 25. The gates 23, 24 are opened respectively during the periods of the trigger signal and phase comparison signal transmissions. In the mixer 25, the outputs of the oscillators 21, 22 are mixed, in cyclic sequence, with the output of the oscillator 20 which is a much higher frequency oscillator to produce the required radiated frequencies. The signal of the frequency to be radiated is then fed to a power amplifier 26 and thence to the transmitting aerial 27. The three oscillators 20, 21 and 22 are used so that the radiated frequencies may be altered as required merely by altering the frequency of the oscillator 20. The oscillators 21 and 22 will then ensure that there is the required frequency difference between the trigger signal and phase comparison signal. The output from the oscillator 20 to the mixer 25 is gated by a gating circuit 29 which is opened during both the trigger signal and phase comparison signal transmission. The timing of the various transmissions is controlled by a timer unit 28 which opens the gates 23, 24 and 29 at the appropriate times. To initiate the cycle the timer first opens gates 23 and 29 for 0.1 second thereby admitting the outputs of the oscillators 20, 21 to the mixer 25 to provide the trigger signal. At the end of this trigger signal transmission the timer closes the gate 23 and opens the gate 24 thereby feeding the outputs of oscillators 20 and 22 into the mixer 25 to produce the required phase comparison transmissions. This transmission lasts for 0.3 second and there is then an interval for transmissions from the other stations until the cycle recommences. It will be assumed in this embodiment that each of the other transmissions from the other stations last for 0.3 second and in this case the interval would be for 1.5 second. Typically the timer might be a transistor relaxation oscillator operating as a ring counter and the exact frequency of operation is not critical.

For checking and servicing other items of equipment it may be desirable to use the master station to provide not only a master signal but also simulated slave signals and for this purpose there is provided a further gate 30 which connects the oscillator 22 to the mixer 25 through a phase shifter 31. This phase shifter preferably is a continuously variable phase shifter of the goniometer type so that the phase of the mixed signal may be adjusted to any required value or may be continuously varied. When it is required to provide a simulated slave signal the gate 30 is opened for 0.3 second at a time interval of either 0.3 second or 0.6 second after the end of the trigger signal depending on whether it is required to simulate the signal of slave 1 or slave 2.

The mistress station is illustrated in FIGURE 4 and is generally very similar to the master station. The same reference characters are used in FIGURE 4 as in FIGURE 3 to indicate corresponding components and mention will only be made now of the distinctive features of the mistress station. The periods of transmission from the mistress station have to be synchronized with those from the master to occur 0.6 second after the end of the master transmission. The synchronization is effected by receiving the control signal from the master station and there is therefore provided a receiving aerial 32 coupled to a receiver 33 for receiving the master transmissions. The output of receiver 33 is combined with the output of a heterodyne oscillator 34 in a mixer 35 to produce an intermediate frequency signal which is amplified by an intermediate frequency amplifier 36. Very conveniently the heterodyne oscillator 34 has a frequency such that the intermediate frequency, when the control signal is received, is the same as the frequency from the oscillator 21 of the master station. The intermediate frequency amplifier 36 may have a bandwidth such as to accommodate both the phase comparison transmissions and the trigger signals from the master station but in the mistress station only the trigger signals are required and these are extracted by a frequency selective circuit 37 and fed to the timing and delay circuit 28 which provides the necessary gate operating pulses for the mistress station. In the particular embodiment being described, the mistress station has to radiate at 0.9 second after the control signal from the master station for a period of 0.3 second and the timer is arranged to provide the necessary gate control pulses for this purpose. The mistress station does not have to radiate any trigger signals and there is therefore no requirement in the mistress station for the oscillator 21 and gate 23 such as have to be provided in the master station. These are provided however to enable the mistress to be used as a master station. The oscillator 22 is, as in the master station, a relatively low frequency oscillator of the order of 132 kc./s. and the oscillator 20 is a much higher frequency oscillator to produce the required radiated frequency. Preferably the oscillators at both the master and the mistress stations are crystal-controlled so that the radiated master and mistress signals are as nearly as possible at the same frequency. Exact synchronization of the frequency is not necessary but, by having the frequencies as nearly equal as possible, the master and mistress signals may be received at the slave stations on a single receiving channel.

Figure 5:
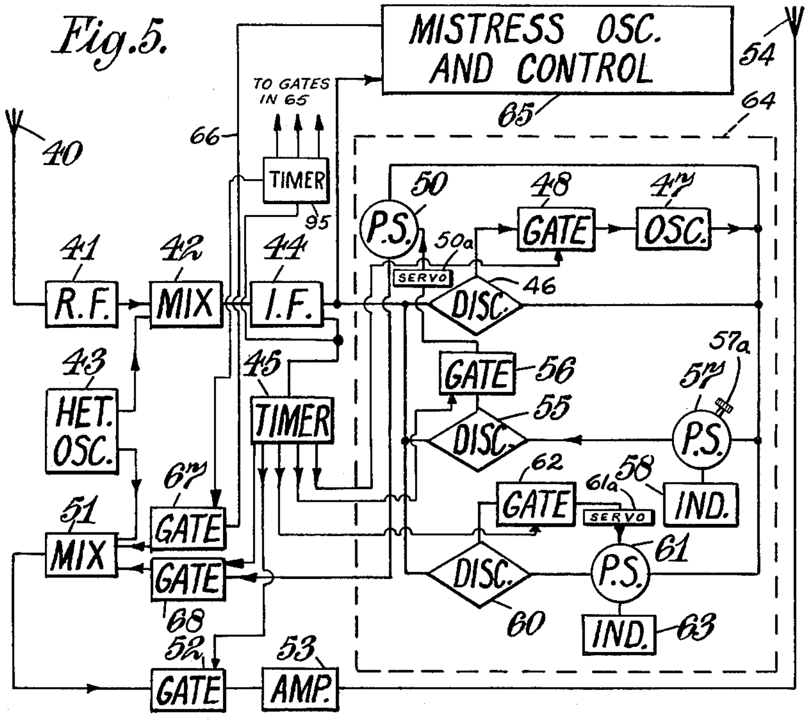
FIGURE 5 is a block diagram illustrating a slave station for use in the navigation system of either FIGURE 1 or FIGURE 2.

The two slave stations, except for the timing of their transmissions in the cycle, are identical and one slave is illustrated in FIGURE 5. The two stations will be referred to as slave 1 and slave 2. Slave 1 transmits for a period of 0.3 second after the end of the master transmission and also for a period of 0.3 second after the end of the mistress transmission whilst slave 2 transmits for a period of 0.3 second after the end of each of the slave 1 transmissions. The slave station as shown in FIGURE 5 has a receiving aerial 40 for receiving the transmissions from the master station. In the particular arrangement illustrated in FIGURE 5 a heterodyne type receiver is employed but a straight receiver may be used if desired. The received signals after amplification in a radio frequency amplifier 41 are fed to a mixer 42 where they are mixed with the output of a heterodyne oscillator 43 to produce an intermediate frequency signal which is amplified in an intermediate frequency amplifier 44. Very conveniently the heterodyne oscillator 43 has a frequency such that the intermediate frequencies are the same as the frequencies from the oscillators 21, 22 at the master station. The intermediate frequency amplifier has a bandwith so as to accommodate both the phase comparison transmissions and the trigger signals from the master station. Since the master and mistress transmissions are on the same frequency as closely as possible, the mistress transmissions will also be accepted by the intermediate frequency amplifier 44. The slave station, after the master transmission, radiates a signal which is locked to the signals received from the master station and then has a break in the transmission until the mistress signal is received whereupon the slave station then radiates a signal locked to this received mistress signal. It is convenient to consider firstly the production and radiation of the signals locked to the master transmission. The trigger signals are extracted by a frequency selective circuit and fed to a timer and delay circuit 45 providing gate operating pulses for operating gates to be described later. The output from the intermediate frequency amplifier is fed to one input of a phase discriminator 46. Into the other input of this discriminator is fed the output from a stable oscillator 47 tuned to the intermediate frequency corresponding to the phase comparison transmissions. The discriminator thus gives an output when there is any phase difference between the output of the oscillator 47 and the received signal from the intermediate frequency amplifier 44. This output from the discriminator is gated by a gating circuit 48 which is opened only during the period of the phase comparison transmissions from the master station by means of the timer 45. The output from the gating circuit 48 is thus respresentative of the difference of phase between the oscillator 47 and the received master signals. From the gating circuit 48 the output of the discriminator is fed as a control signal to control the phase of the oscillator 47 to hold that phase in a predetermined relationship with the phase of the received master signals. The oscillator 47 is a high stability oscillator with a natural frequency equal to the intermediate frequency output from the amplifier 44 corresponding to the phase comparison transmissions of the master station. The gate circuit 48 prevents the oscillator control being affected by any signals except the appropriate transmissions from the master station and the oscillator 47 thus provides a continuous signal output having a phase which represents the phase of the master transmissions.

The output from this oscillator 47 is used to provide the required signals for radiating from the slave station and for this purpose the output from the oscillator 47 is fed through a goniometer type phase shifter 50 and through a gate 68 to a mixer 51 where the signals are mixed with signals from the aforementioned heterodyne oscillator 43 to produce an output of the same radio frequency as the master transmissions. The output from the mixer 51 is fed through a gate 52, which is opened by the timer 45 during the period of the required slave transmission in each cycle, and thence to a power amplifier 53 which amplifies the signals for radiation from an aerial 54. There is also provided a phase discriminator 55 which compares the output from the intermediate frequency amplifier 44 with the output from the oscillator 47. This discriminator output should be zero during the period of the slave transmission if the signals are perfectly locked in phase. If, however, any phase change should occur between the master signals and the local slave transmission, the output of the discriminator 55 during this period is no longer zero. The output from the phase discriminator 55 is fed through a gate 56 to a servo drive 50*a* for the aforementioned phase shifter 50. The gate 56 is opened during the period of the slave transmission so that the discriminator 55 compares the phase of the slave signal as radiated from the aerial 54 and picked up by the receiving aerial 40 with the phase of the output of the locked oscillator 47 so that this discriminator provides a drive to the phase shifter 50 only when the slave station is radiating, the discriminator 55 detecting any local phase shifts in the transmitting system. A goniometer type phase shifter 57 is connected between the output of the oscillator 47 and the input to the discriminator 55 to enable phase adjustment to be effected of the pattern produced by the master and this slave by means of a manual control 57*a*. Alteration of the phase shifter 57 thus shifts the equiphase lines of the pattern. The pattern is usually standardised with zero phase shift on the phase shift 57 and an indicator 58 is coupled to the phase shifter 57 for indicating this phase shift. The phase shifter 57 may be manually adjusted however if it is desired to alter the phase relationship between the slave transmission and the received master signal.

It is also convenient at each slave station to have an indicator indicating the phase relation at that slave station between the transmissions from the master station and the transmissions from the other slave station, so that each slave station can be used as a monitor for the other slave. For this purpose there is provided a further phase discriminator 60 which compares the phase of the output of the intermediate frequency amplifier 44 with the phase of the output from the oscillator 47. The output of the oscillator 47 is fed to the phase discriminator 60 through a goniometer type phase shifter 61 and this phase shifter 61 is servo-driven through a servo-control 61*a* by the discriminator output during the period of the appropriate slave transmission, that is to say when the monitor phase measurement can be made, a gate 62 being provided in the discriminator output circuit for this purpose. The output of the discriminator 60 thus sets the phase shifter 61 to a value to give a standard datum relationship between the two inputs to the discriminator 60, conveniently an in-phase relationship, and the setting of the phase shifter 61 is thus a measure of the actual phase relationship between the output of the oscillator 47 and the output of the intermediate frequency amplifier 44 during the appropriate time periods when the gate 62 is open. This setting is indicated on an indicator 63 conveniently in the form of a digital display, the goniometer type phase shifter 61 driving a digital counter for this purpose.

In the slave station, the gates 48, 52, 56 and 62 are controlled by the timer 45, which serves to open each gate for the appropriate period. Very short duration guard intervals are provided between the closing of one gate and the opening of the next to allow a reasonable tolerance in the transmission cycle timing and to prevent any transient or overlap effects on the operation.

For providing the transmissions locked to the mistress transmission, the part of the equipment at the slave station shown within the dashed line rectangle 64 is duplicated, the additional equipment being shown diagrammatically by the rectangle 65. This equipment includes a separate oscillator corresponding to the oscillator 47 but which is locked to the mistress transmissions received from the intermediate frequency amplifier 44. By suitable timing of the gating circuit corresponding to the gate 48 of unit 64, the output from the mistress oscillator in the slave station is fed by means of a lead 66 through a gate 67 to the mixer 51 were it is combined with the output from the heterodyne oscillator 43 and fed via the gate 52 and amplifier 53 to the aerial 54 in exactly the same way as the signals locked to the master transmissions. The gates 68 and 67 are opened at the appropriate times after the master and mistress transmissions respectively whilst the gate 52 would have to be opened after both master and mistress transmissions. The gates in unit 65 corresponding to the gates 48, 56 and 62 are opened at the appropriate times after the mistress transmission by the timer 95, which is fed from the same output of the intermediate amplifier 44 as is the timer 45. The timer 95 also serves to open the gate 67 at the appropriate time whereas the gate 68 is opened by the timer 45 at the appropriate time.

Figure 7:
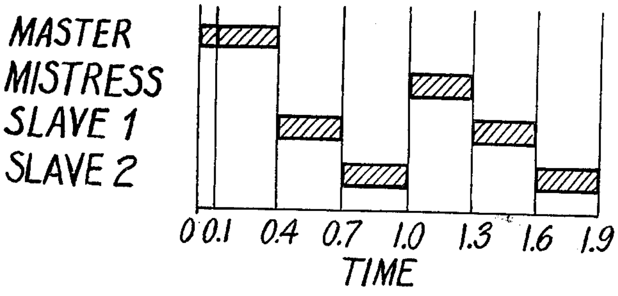
FIGURE 7 is a graphical diagram illustrating the time-sharing sequence employed for the transmissions from the various transmitting stations.

The timing sequence is shown in FIGURE 7 which is a graphical diagram in which time extends from left to right . The master station radiates first the control signal for a period of 0.1 of a second and then a phase comparison signal for a further period of 0.3 of a second. The first slave then radiates for 0.3 of a second followed by the second slave for a similar period, these two slave transmissions being locked in phase to the master signals. Immediately after this the mistress station radiates for 0.3 of a second followed by transmissions from the two slaves in sequence each for a period of 0.3 of a second, the slave transmissions in this case being locked to the mistress transmission. The cycle is then repeated.

Figure 6:
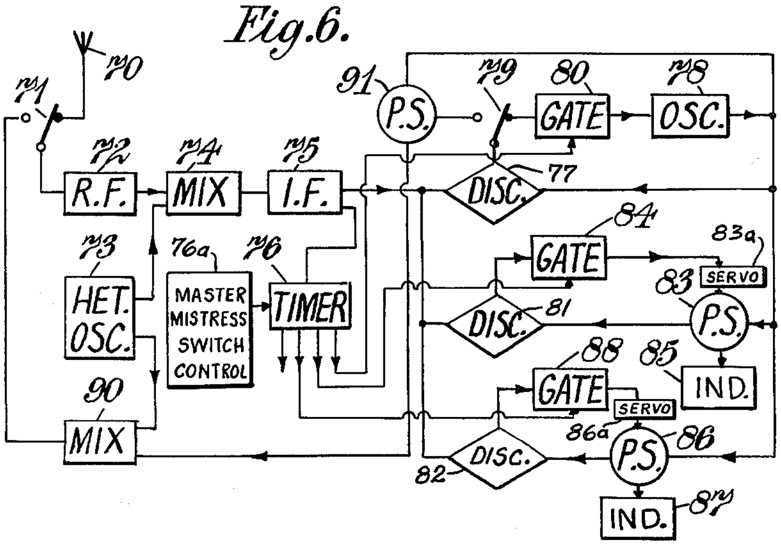
FIGURE 6 is a block diagram illustrating a receiver for use in the navigation system of either FIGURE 1 or FIGURE 2.

FIGURE 6 illustrates a mobile receiver such as may be used for determining the position of a craft with respect to a hyperbolic pattern such as is shown in FIGURE 2. For convenience the same form of receiver is used in a two-range system although, as will be apparent, the receiver in a two-range system used on the master craft could be arranged to receive the necessary timing signals direct from the master station through wire connections instead of using the received radio signals. It will be seen that the mobile receiver is very similar to the receiving equipment used in the slave station and in practice it is convenient to use identical equipment which can be switched alternatively for use either as a mobile receiver or for a slave station. In the receiving equipment illustrated in FIGURE 6 there is an aerial 70 for receiving the radiated signals. These signals pass through a switch 71 to a radio frequency amplifier 72 where they are amplified and then mixed with the output of a heterodyne oscillator 73 in a mixer 74 to give an intermediate frequency signal which is amplified by an intermediate frequency amplifier 75. This amplifier has a sufficient wide pass-band to amplify not only the master and slave phase comparison transmissions but also the slightly different frequency trigger transmission from the master station. The amplifier will also receive the transmissions from the mistress station and the associated slave transmissions. As will be explained later the gating circuits are operated so that the receiver is effective to indicate position lines either using the master and associated slave transmissions or the mistress and the associated slave transmissions. The operations in these two respects are identical apart from the timing of the opening of the various gating circuits and it is therefore more convenient in the following description to refer in the first place only to the master transmissions. In the receiving equipment, the trigger signals are separated by a frequency selective circuit and fed to a timer 76 which controls the operation of various gating circuits as hereinafter described. A phase discriminator 77 compares the phase of the output of the intermediate frequency amplifier 75 with the phase of an output of the same frequency from a stable oscillator 78. If the output of the oscillator 78 is in phase with the output from the intermediate frequency amplifier 75 there is no output signal from the phase discriminator 77. Any phase variation however produces an output from the discriminator which is fed through a switch 79 and a gate 80 to control the oscillator 78 to bring the latter back to the required phase condition. The gate 80 is opened only during the period of the master phase comparison transmissions and thus the oscillator 78 is maintained in phase with the received master signals. The output of the oscillator 78 is thus representative of the phase of the master signals. The output from the oscillator 78 is continuously available however and it can therefore be compared in phase with the two received slave signals, when those signals are received, to provide the required phase indications. For this purpose there are provided two further phase discriminators 81, 82. To one input of the discriminator 81 is fed the signal from the intermediate frequency amplifier 75 whilst to the other input there is fed the reference signal from the oscillator 78 through a goniometer type phase shifter 83. If the signal from the oscillator 78 after passing through the phase shifter 83 differs in phase from the input signal from the amplifier 75 the discriminator 81 gives an output which is fed through a gating circuit 84 to a servo drive 83*a* for the phase shifter 83 to drive the latter in a direction so as to correct for this phase deviation. The gating circuit 84 is opened during the period of transmissions from slave 1 and thus the phase shifter 83 is maintained set in a condition representative of the phase relationship between the received master signals and the received signals from slave 1. In this type of phase measuring device using a servo-driven phase shifter in one of the inputs to the phase discriminator the phase shifter is driven by a servo motor to maintain the output of the phase discriminator at zero volts. The phase shifter thus makes one revolution for each cycle of phase difference and is servo-driven; it may therefore readily be arranged to have sufficient torque to drive various forms of display devices. The display unit 85 thus displays the phase relationship between the signals from the master station and from the slave S1 as received at the location of the receiver.

The phase discriminator 82 is connected in a circuit similar to that of phase discriminator 81. One input to the phase discriminator 82 is from the intermediate frequency amplifier 75 whilst the other input is from the oscillator 78 through a goniometer type phase shifter 86. This phase shifter 86 is driven by a servo-motor 86*a* controlled by the output of the discriminator 82 during the period of the slave 2 transmissions, the output of the discriminator, for this purpose, being passed to the servo drive for the phase shifter through a gate 88 which is opened only during these slave 2 transmissions. The goniometer type phase shifter 86 drives an indicator 87 which is similar to the indicator 85, but which indicates the phase relationship between the signals received from the master station and slave 2.

The use of identical frequencies for the master and slave transmissions largely frees the system, in effecting a phase comparison, from differential phase errors due to thermal or other causes. It is desirable, however, to provide referencing means whereby the whole receiver from the aerial input circuit onwards may be checked if desired. Such a referencing signal provides in the receiver a phase datum which will be the same for all users of the system and thus permits of true repeatability of measurements. For this purpose an internal signal is generated by beating the outputs of the oscillator 78 and the heterodyne oscillator 73 in a mixer 90 to provide a signal of the received radio frequency. By means of the switch 71, this internally generated signal from the mixer 90 may be fed into the radio frequency amplifier 72 in place of signals from the aerial 70. The switch 71 is ganged with the aforementioned switch 79 so that, when referencing, the output of the phase discriminator 77 is applied to a servo-motor driven goniometer type phase shifter 91 in the circuit from the oscillator 78 to the mixer 90. The phase shifter 91 will thus turn so as to equalize the phase of the reference signals applied to the two sides of the two phase discriminator and indicator circuits 81, 83, 84, 85 and 82, 88, 86, 87 respectively. When this condition is satisfied the two indicators 85, 87 should read zero. If either does not, it may be manually corrected by rotating the stator of the appropriate goniometer type phase shifter 83 or 86.

It will be noted that the oscillator 47 in each of the slave stations and the oscillator 78 in the receiver oscillates at the predetermined intermediate frequency. Thus to change the frequency of operation of the system, it is merely necessary to change the frequency of oscillator 20 at the master station and to make the corresponding changes in the frequency of the heterodyne oscillator 43 at each slave station and the heterodyne oscillator 73 at each receiver. Conveniently multi-position switches are provided at each transmitter and receiver to enable any one of a number of different frequencies to be selected.

The operation of the receiver of FIGURE 6 with the mistress transmissions is identical with that using the master transmissions apart from the change in the timing operation of the gating circuits. Thus merely by operating a master-mistress switch control 76*a* switching of delay circuits in the timer 76, the outputs used for operating the indicators may be derived either from the master transmissions with the associated slave transmissions or alternatively from the mistress transmissions with the associated slave transmissions and no further description is believed necessary.

It will be seen that with the above described equipment, two slave stations may be used either with a master station to provide either a hyperbolic fixing pattern for use by any number of vessels in an area or as a two-range system with the master transmitter on a mobile craft. In addition the mistress station may operate quite independently of the master station to obtain two-range fixing. The mistress transmissions are quite independent of the master transmissions apart from the control of the timing. The accuracy of the two-range system using the mistress transmissions is in no way dependent on the master transmissions and likewise position fixing using the master station is wholly independent of the mistress transmissions. Since the master station, if it is used as a two-range system, may move out of the range at which the timing control signals are effective, preferably provision is made for alternatively radiating the timing control signals from the mistress station or from one or other of the slave stations.

Although the equipment has been more particularly described with the provision only of a single mistress station, it will be obvious that further mistress stations could be provided with all the stations operating in a suitable time sequence so that there is transmission only from one station at a time, the slave stations providing transmissions locked to the master station and each of the mistress stations in the appropriate sequence.

I claim:

1. A phase comparison radio navigation system comprising a master station at a fixed location, said master station having transmitting means periodically radiating signals of a given frequency; a further station on a first mobile craft, said further station having transmitting means periodically radiating signals of a second frequency, said second frequency being approximately the same as said given frequency; at least two slave stations at fixed locations, each slave station having a receiver for receiving the signals from the master station and the further station and transmitting means for radiating signals of the same frequency as those received by the respective slave station receivers and locked in phase thereto; timing means in one of the stations providing synchonizing signals, said timing means also controlling the periods of radiation of the transmitting means in that station; receiving means at each of the other stations for receiving the synchronizing signals; timing means at each of said other stations, the timing means being controlled by said synchronizing signals and controlling the periods of radiation of the respective transmitting means so that the various stations radiate one at a time in a predetermined time sharing sequence with each slave station transmitting means radiating, at different periods in each cycle, signals locked in phase to the signals radiated from the master station and the further station respectively; first phase comparison means on a further mobile craft, said first phase comparison means receiving the signals of said given frequency from said master and slave stations and determining the phase relationship thereof; and further phase comparison means on said first mobile craft, said further phase comparison means receiving the signals of said second frequency from said slave stations and determining the phase relationship between them.

2. A phase comparison radio navigation system comprising, in combination with a mobile receiver, a master station having transmitting means periodically radiating signals of a given frequency; a further station having transmitting means radiating signals of approximately said given frequency; and at least two slave stations, each slave station having two oscillators, means for receiving signals from the master station and said further station, means for locking the frequency and phase of the two oscillators to the received signals from the master and further station respectively, and means for radiating signals locked in phase and frequency to an output of alternatively either one of the oscillators; said master station further having timing means providing synchronizing signals, the timing means in the master station also controlling the periods of radiation of the master station transmitting means, and each of the other stations having means for receiving the synchronizing signals and timing means controlled by the received synchronizing signals arranged to control the periods of radiation of the transmitting means in the respective stations so that the various stations radiate one at a time in a predetermined cyclic time-sharing sequence with each slave station radiating, at different periods in each cycle, signals locked in phase to the outputs of each of its oscillators; and wherein said mobile receiver comprises means for receiving the radiated signals, timing means controlled by the received synchronizing signals, an oscillator, switchable means controlled by said timing device for locking the oscillator in the receiver in frequency and phase to received signals alternatively from said master station or said further station and phase comparison means controlled by said timing device for comparing the phase of radiations received from each of the slave stations with the output of the oscillator during the periods when the slave radiations are locked in phase to that radiation to which the receiver oscillator is locked.

3. A phase comparison radio navigation system as claimed in claim 2 wherein the slave stations are at fixed locations and wherein the master station and the mobile receiver are carried on a mobile craft.

4. A phase comparison radio navigation system as claimed in claim 2 wherein the slave stations are at fixed locations and wherein said further station and the mobile receiver are carried on a mobile craft.

References Cited by the Examiner

UNITED STATES PATENTS

| | | | |
|---|---|---|---|
| 2,528,141 | 10/50 | Hastings | 343—105 |
| 2,768,374 | 10/56 | Rust | 343—105 |

OTHER REFERENCES

IRE Proceedings, May 1959, (pages 829–835).

LEWIS H. MYERS, *Primary Examiner.*

CHESTER L. JUSTUS, *Examiner.*